July 22, 1924.

A. WATERMAN

SHOCK ABSORBER

Filed Feb. 7, 1922 2 Sheets-Sheet 1

1,502,364

INVENTOR
Arthur Waterman
BY
ATTORNEYS

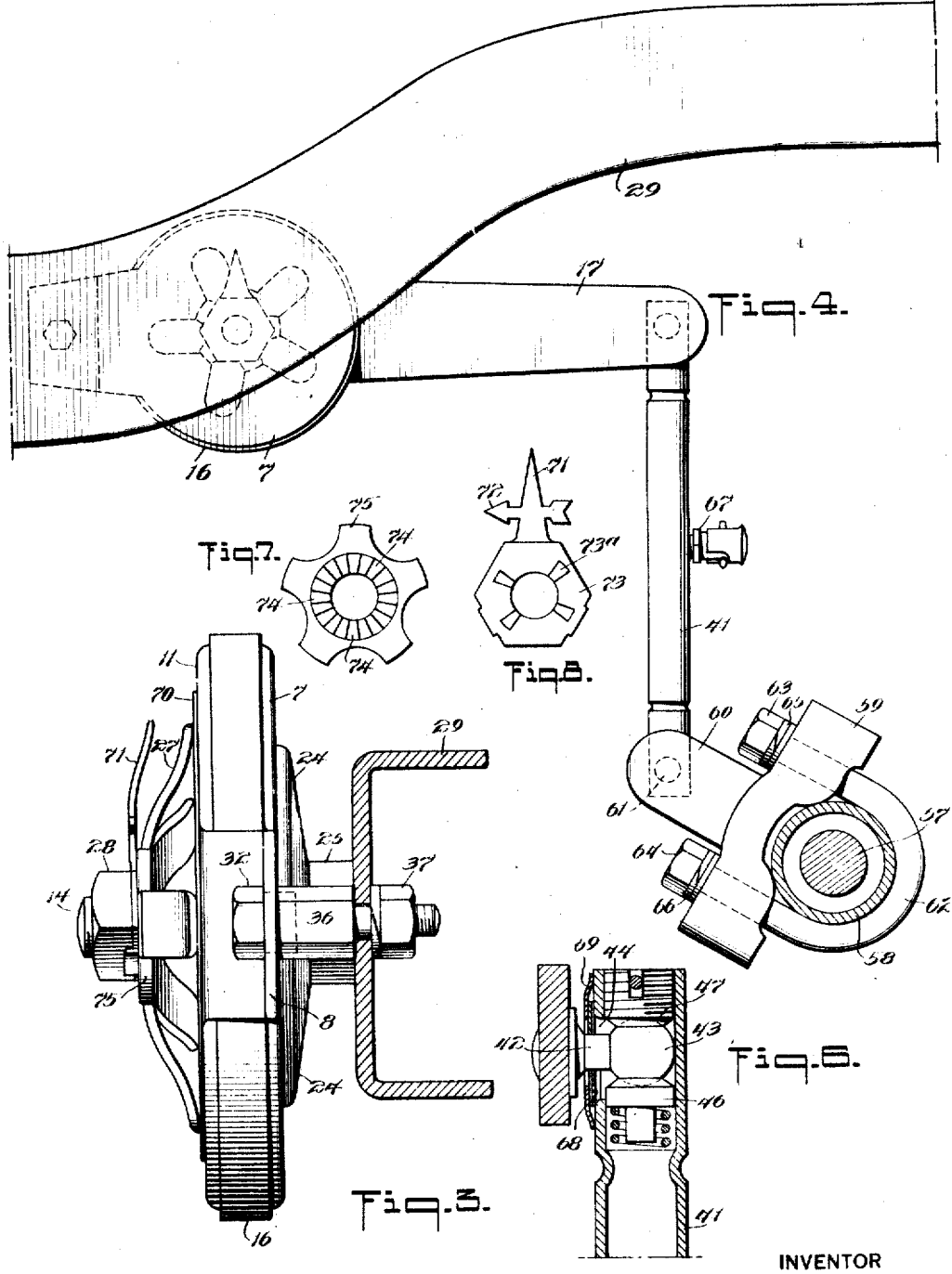

Patented July 22, 1924.

1,502,364

UNITED STATES PATENT OFFICE.

ARTHUR WATERMAN, OF EAST ORANGE, NEW JERSEY, ASSIGNOR TO EDWARD V. HARTFORD, INC., OF NEW YORK, N. Y., A CORPORATION OF NEW YORK.

SHOCK ABSORBER.

Application filed February 7, 1922. Serial No. 534,679.

*To all whom it may concern:*

Be it known that I, ARTHUR WATERMAN, a subject of the King of Great Britain and Ireland, and declarant of intention to become a citizen of the United States, residing at East Orange, county of Essex, State of New Jersey, have invented a certain new and useful Improvement in Shock Absorbers, of which the following is a specification.

The present invention relates to improvements in anti-vibration devices for vehicle suspensions, which devices are more commonly known as shock absorbers by reason of the fact that they act to retard or slow the relative movement of the suspended parts of the vehicle and thereby reduce or minimize the jars or shocks which are ordinarily transmitted to such suspended parts when the suspension mediums are permitted to act without control.

More specifically, the present invention is directed to an anti-vibration device or shock absorber of the friction type, wherein certain elements are cooperatively associated to interpose a frictional resistance to the relative movements of the suspended parts of the vehicle to which the said devices are attached.

As is well known in the art, the body of a vehicle is usually supported on a frame which is suspended from the vehicle axles or running gear by various types of laminated springs. The purpose of and the method in which the springs function are common knowledge, and hence it will be unnecessary to describe the same or specifically point out the general reasons for the use of shock absorbing devices which it is found necessary to employ to successfully obtain the easy riding qualities which are demanded in vehicle construction.

The general object of the present invention is to provide an anti-vibration device or shock absorber which will retard or slow the movement of the vehicle springs when deflected by the vehicle wheels passing over undulations or obstructions in the road bed, so that the jars or shocks incident to the suspension action will not be transmitted to those in the vehicle.

More specifically, it is an object of the present invention to provide an anti-vibration or shock absorbing device which will effect the retardation of the relative movements of the suspended parts by interposing a progressively increasing frictional resistance thereto, this frictional resistance increasing proportionately with the increase in the deflection of the suspension medium.

This invention is further designed to be economically produced, the parts therein being reduced to a minimum and being so assembled that the device may be readily attached to motor vehicles and the like without alteration thereof, and in a manner which will permit the vehicle parts to have a considerable range of relative lateral movement without impairing the efficiency of operation of the device.

Furthermore, this invention is designed for general application to motor vehicles of various types and forms of construction without making it necessary to provide special fittings or connections, thereby facilitating the attachment of the devices to the vehicles and greatly increasing the sphere of usefulness thereof as compared to those devices which require alteration of the vehicle frames or other parts, or specially designed and constructed fittings.

For the purpose of the present disclosure, a preferred embodiment of the invention is shown and described. It will be understood, however, that the invention may take other forms without departing from the spirit and scope thereof, as defined by the appended claims.

The invention will now be described with reference to the accompanying drawings, in which Figure 1 is a view in elevation, partly in section, of a portion of certain suspended parts of a vehicle with an anti-vibration device or shock absorber, made in accordance with the present invention, attached thereto;

Figure 4 is a view similar to Figure 1, illustrating another method of connecting the anti-vibration device or shock absorber to a part of the running gear of the vehicle.

Figure 5 is an enlarged detail of a portion of the structure of the anti-vibration device or shock absorber, Figure 6 is an enlarged sectional elevation of the means for connecting the arm of the anti-vibration device to the vehicle running gear, and Figures 7 and 8 are plan views of the tension indicator and cooperating plate.

Figure 1:
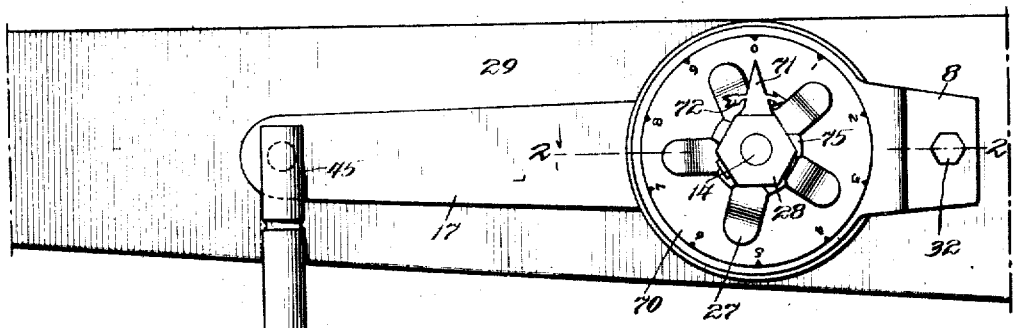
Figure 3:
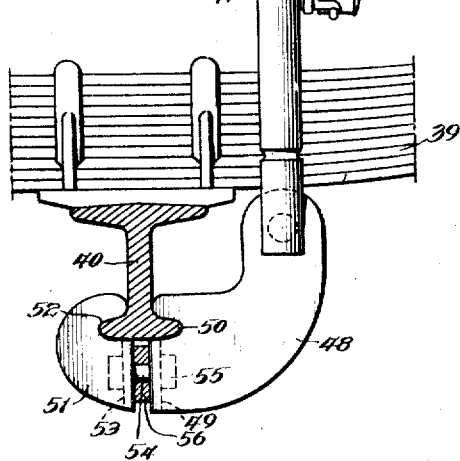
Figure 3 is a view in elevation looking from the right-hand end of Figure 1.
Figure 3:
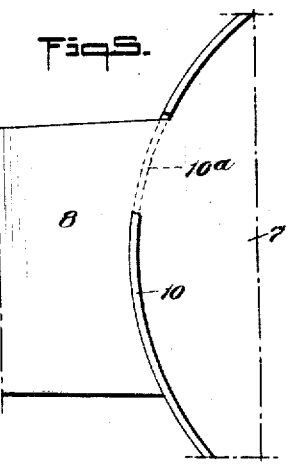

Referring now to the drawings in detail in which like characters of reference are employed to designate similar parts throughout the several views, 7 indicates an annular plate which is provided with a preferably integrally formed arm or extension 8. This plate 7 is centrally apertured at 9 and is provided with a peripheral flange 10 which is interrupted or broken adjacent to said arm or extension 8, as shown at 10ª in Fig. 5.

Figure 2:
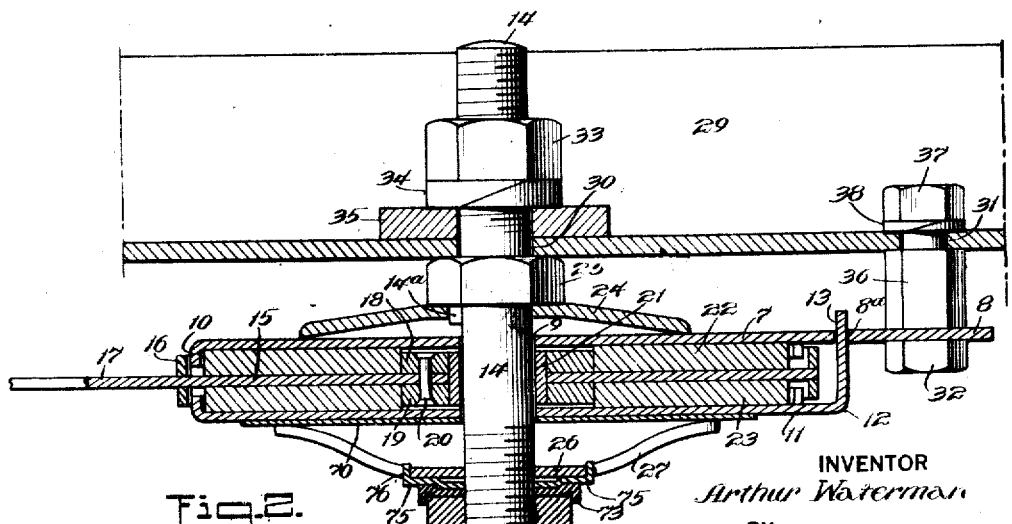
Figure 2 is a sectional view on line 2—2 of Figure 1.

A plate similar in configuration to the plate 7 is shown at 11, which is provided with a preferably integral extension 12 bent at a right angle to the plate and formed with a reduced portion or tongue 13 at the end thereof, which is adapted to register with and enter a slot or opening 8ª in the extension 8 of the plate 7 (see Fig. 2).

As will be observed, the plates 7 and 11 are adapted to be positioned upon the stud or bolt 14 so that their peripheral flanges 10 and 11ª are in opposed relation to each other. Mounted for rotation upon the stud 14, and intermediate of the plate 7 and 11 is a flat annular member 15 formed with a peripheral flange or rim 16 and provided with a preferably integral arm or extension 17. To increase the bearing surface of the member 15 on the stud 14, the said member is provided with a hub which may be formed integral therewith, or, as herein shown, may comprise washers 18 and 19 positioned on the opposite faces of said member and rigidly secured thereto by means of rivets or the like 20. A bushing 21, preferably of anti-friction material is inserted within the bearing formed by the hub of the member 15.

Located between the opposed faces of the members 7, 11 and 15, respectively, are friction washers or discs 22 and 23. These washers or discs are of an annular configuration and of a diameter to lie within the respective peripheral flanges of the plates 7 and 11, the said discs or washers being centrally apertured to fit freely upon the hub of the member 15, as shown in Fig. 2.

The stud 14 is preferably threaded at each end and at an intermediate portion is provided with a key 14ª adapted to register with a slot or recess in the plate 24, the latter of which is preferably formed of resilient material and of the configuration shown. Adjacent to the plate 24 on the stud 14 is an abutment 25, against which said plate is adapted to bear for the purposes which will be hereinafter explained.

When the parts of my device thus far described have been assembled, they are held in cooperative relation on the stud 14 under tension, which in the present embodiment of my invention is exerted by a star or spider spring. The body portion 26 of this spring is centrally apertured to fit upon the end of the stud 14 so as to permit the radial arms 27 to contact with the contiguous surface of the plate 11. The tensioning device is held on the stud 14 by means of a nut 28 adapted for threaded engagement with said stud, this nut serving also as a means for regulating or adjusting the pressure exerted by said device.

Obviously the arms 27 of the tensioning device bear upon and exert a constant pressure in a zone adjacent to the periphery of the plate 11, in a direction counter to that obtained by the employment of the resilient plate 24 bearing upon the plate 7 so that the juxtaposed surfaces of the plates 7, 11 and 15 of the friction washers or discs 22 and 23 are held in constant frictional contact over their entire areas.

In the application of my invention to a vehicle, the web of the longitudinal frame member 29 is preferably apertured at 30 and 31, the aperture 30 being of a size to permit of the passage of the stud 14 therethrough, while the aperture 31 is adapted to receive a bolt 32. As will be observed, the abutment 25 bears against the outer surface of the web of the frame member 29, the body of the shock absorber being rigidly supported from the frame member by means of the nut 33 in threaded engagement with the end of the stud 14. A lock washer 34 is preferably employed in conjunction with the nut 33 to lock the latter against movement, and if desired, a plate or spacer 35 may be disposed between the inner face of the web of the frame 29 and the lock washer, this spacer also serving as a reinforcement for said web. The bolt 32 passes through the aperture formed in the arm or extension 8 of the plate 7 and preferably carries a sleeve or spacer 36, whereby, when the securing nut 37 is in locking engagement with the washer 38, the said arm or extension and the body portion of the plate 7 will lie in a plane parallel to the web of the frame member 29. When the shock absorber is mounted on the frame member 29, as just described, it will be clearly seen that the plates 7 and 11 are non-rotatable with relation to the stud 14, while the member 15 is free to rotate thereon as hereinafter set forth.

When the shock absorber is attached to the frame member 29, the arm or extension 17 of the plate 15 is connected to the axle, or other suspended part of the running gear. Owing to the lateral movement or the side sway of the frame with relation to the axle, by reason of the action of the vehicle springs 39, it is essential that a means of connection be employed which will compensate for relative lateral movement without impairing the efficiency of operation of the shock absorber, by throwing the arm 17 out of line and effecting canting of the frictionally contacting parts. In the present embodiment of my invention, I employ a connection between the arms 17 and the axle 40 of the vehicle, which is capable of universal movement and will therefore permit of the efficient operation of my device irrespective of the relative movement of the vehicle parts. This connection comprises a drag link 41 of the general type employed in motor vehicle construction. The arm 17 is provided with a stud 42 having a spherical head 43 which is adapted to enter the aperture 44 in the upper end socket member 45 of the drag link 41 for engagement by the socket members 46, 47 in the usual manner.

For connecting the lower socket member of the drag link 41 to the front axle of a motor vehicle, I have employed a bracket, such as shown in Fig. 1, which consists of a plate 48 having right-angularly disposed flanges 49 on each side thereof, and recessed as shown at 50 to conform to the contour of a portion of the lower axle flange. A second plate 51, similarly recessed at 52 and flanged at 53, is adapted to be positioned on the opposite side of the axle, and the bracket rigidly and securely clamped thereto, by means of the bolts and other cooperating washers 54 and 55. If desired, a spacer 56 may be inserted between the opposite faces of the flanges of the respective plates 48 and 51 to take care of any variation in the size of the lower flange of the axle. The plate 48 adjacent to its upper end is provided with a stud having a spherical head, similar to that carried by the arm 17, the head of said stud being adapted for action within the lower socket member of the drag link 41 in the usual manner.

In Fig. 4, I have shown a preferred method of attaching the lower end of the drag link 41 to the rear axle or housing of a motor vehicle. In this figure, 57 indicates the axle and 58 the rear axle housing. 59 is a hook or bracket having an extension 60, which carries a stud 61 having a spherical head similar to the stud 42. The hook is preferably of a configuration to conform substantially to the contour of the housing 58, and extends therebeyond so as to permit of the passage of the arms of the U-bolt 62 therethrough, the bracket being securely fastened to the rear axle housing by means of the lock washers 65 and 66, and the cooperating securing nuts 63 and 64 in threaded engagement with said U-bolt.

In order to insure proper and sufficient lubrication of the ball and socket joints, I have found it desirable to locate a grease cup 67 on the drag link 41. This grease cup may be of any desired type, but I have found it preferable to employ that form which is usually employed in pressure lubrication, so that the lubricant may be positively applied to each of the connections of the drag link. In order to prevent loss of the lubricant, through the aperture 44, in the respective ends thereof, I provide a closure for said aperture which comprises a plate 68 formed of two sections, each of which has one end recessed to fit about the shank of the stud entering said aperture. These plates conform to the contour of the exterior of the end of the drag link adjacent to said aperture 44 and move with the stud within the guideway formed by the wall of the drag link and the plate 69. The latter plate is formed of resilient material and frictionally engages the wall of the socket end of the drag link, the said plate being centrally apertured to permit of the passage of the spherical stud head therethrough in the assembly of the closure.

When the shock absorber is mounted on the vehicle frame and the arm 17 thereof connected to the axle of the vehicle, as described, the friction elements which may be considered as comprising the plates 7, 11, and 15, and the friction discs or washers 22 and 23, are placed under a predetermined degree of tension by adjusting the nut 28 on the stud 14. To facilitate adjustment, and in order that substantially the proper tension may be obtained in vehicles of different weight or spring action, I interpose a plate 70 on the outer face of the plate 11, upon which the extremities or feet of the arms 27 of the tensioning device are adapted to bear. This plate is provided with suitable indicia to show the approximate initial resistance in pounds to the relative movement of the vehicle parts, to which the shock absorber is connected. A pointer 71 embodying an arrow 72, indicating the direction of rotation, extends from a preferably hexagonal plate 73 which is mounted on the stud 14 and provided with upturned edges to form a seat for the nut 28. The under side of the plate 73 is formed with a plurality of notches or depressions, which are adapted to be engaged by the radial projections 74 on the upper surface of the substantially star-shaped plate 75. The plate 75 is formed to fit upon the body portion 26 of the tensioning device, the ends of the respective arms of said plate being inwardly turned, as shown at 76 in Fig. 2, to lie between the arms 27 adjacent to the body portion 26 of the tensioning device. As will be apparent, the notches 73ª in the plate 73 riding over the projecting surfaces 74 of the plate 75 will permit of a graduated, or step by step movement of the securing nut 28, so that the proper degree of adjustment may be expeditiously obtained; also the cooperation of the aforesaid notches and projections will serve to effectively lock the nut 28 against rotation when the adjustment has been made.

In the operation of my device, it will be obvious that the friction elements are in constant frictional contact, and that a resistance will be interposed to the relative movement of the vehicle parts, to which the device is attached, on the compression of the vehicle spring and likewise on the recoil or expansion thereof. When the vehicle is passing over minor obstructions or undulations in the road bed, the frictional resistance to the relative movement of the vehicle parts will not be as great as where the obstructions or obstacles produce relatively greater movement of the suspended parts. I have found in the practical application and use of my invention that my device interposes a frictional resistance to the movement of the vehicle parts which varies proportionately with the deflection or movement of the vehicle springs. For instance, it will be assumed that the vehicle and shock absorber parts are in the position shown in Figure 1, the vehicle spring being in its neutral position and the friction elements of the shock absorber being under tension to produce an initial resistance of thirty pounds to the relative movement of the vehicle parts. It will be apparent therefore, that the deflection of the vehicle spring in encountering an obstacle in the road will produce an upward movement of the arm 17. As this arm or extension moves upwardly, the angle between said arm and the drag link 41 is contracted and the force of leverage is coincidently reduced so that the resistance offered by the shock absorber to the spring movement is increased proportionately to the deflection of the springs, and effectively retards or slows the upward or compression movement of the vehicle spring. As the spring expands or recoils, it is obvious that the greatest resistance will be interposed at the point where the liberation of the energy stored up by the compression of the spring is initiated, the resistance offered to the expansion of the spring diminishing proportionately as the energy of the spring is spent or dissipated.

From the foregoing description of my invention, it will be manifest that I have produced a structure which may be economically produced and which is so designed that it will be compact so as to permit of installation upon a motor vehicle in a manner which will leave sufficient clearance for the relative movement of the vehicle parts without affecting the performance of my device. The plates 7, 11 and 15 are preferably stamped from sheet metal but, of course, may be castings or may be made of any material suitable to the purpose for which said parts are designed. The friction washers 22 and 23 are preferably formed of the well known arguto wood which possesses a high degree of durability and, when associated with the metal plates 7, 11 and 15, produces a frictional resistance which is highly efficient in the operation of my device. It will be understood, however, that I do not confine myself to arguto wood for these parts as they may be made of brass or any other suitable material which will serve to carry out the objects of my invention.

I claim:

1. A shock absorber for vehicles having spring supporting means, comprising inner and outer superposed discs, the outer discs being relatively non-rotatable, a member formed to be rigidly secured to a part of the vehicle and provided with a portion adapted to pass through said discs to maintain the same in axial alinement, means for rendering said outer discs non-rotatable relative to said vehicle part, a tensioning device for maintaining all of said discs in frictional contact, and means of connection between an inner disc and another part of the vehicle whereby the relative movement of the vehicle parts will be controlled by said device.

2. A shock absorber for vehicles having spring supporting means comprising a plurality of inner and outer superposed annular discs, a supporting member therefor adapted to be rigidly secured to a vehicle part and having a portion formed to pass through said discs to maintain the same in axial alinement, means for preventing rotation of the outer discs relative to said vehicle part, and means for connecting an intermediate disc to another vehicle part, said latter means embodying a universal joint, and a tensioning device for maintaining all of said discs in constant frictional engagement whereby the movement of said intermediate arm will interpose a variable resistance to the relative movement of the vehicle parts.

3. A shock absorber for vehicles having spring supporting means comprising a plurality of superposed friction elements, the outer elements being relatively non-rotatable, a bracket having a portion adapted to be rigidly secured to the frame of a vehicle, and integral means extending through said elements to support the same in axial alinement, means for preventing rotation of said outer elements relative to said bracket, an arm carried by an intermediate element, and means for connecting said arm to the axle of the vehicle whereby said latter element will rotate in frictional engagement with the outer elements to retard the relative movement of the frame and axle of the vehicle.

4. A shock absorber for vehicles having spring supporting means comprising a plurality of flat annular inner and outer discs, means for supporting said discs in superposed relation, said means being adapted for attachment to a part of the vehicle, means for connecting the outer discs to prevent relative rotation thereof, means for connecting an intermediate disc to another part of the vehicle, and means for maintaining all of said discs in constant frictional engagement, whereby said intermediate disc will rotate on said supporting means to interpose a variable resistance to the relative movement of the vehicle parts.

5. A shock absorber for vehicles having spring supporting means, comprising inner and outer annular discs, means for supporting said discs in axial alinement, said supporting means being adapted for rigid connection to a part of the vehicle, means carried by the outer discs and cooperatively associated to prevent relative rotation of said discs, said latter means being adapted for rigid connection to the vehicle part which carries the supporting means, an arm extending from an intermediate member and a connection between said arm and another part of the vehicle, said intermediate member being capable of rotation on said supporting means upon relative movement of the vehicle parts to interpose a progressively increasing resistance upon the compression movement of the vehicle spring and a diminishing resistance to the return of the spring to its neutral point.

6. A shock absorber for vehicles having spring supporting means, comprising annular inner and outer discs, means for supporting said discs in superposed relation from a part of the vehicle, means for connecting the outer discs to prevent relative rotation thereof, said latter means being adapted for rigid attachment to said vehicle part, an arm extending from an intermediate disc, means for connecting said arm to another part of the vehicle, means applying tension to said discs to maintain the same in constant frictional contact whereby the rotation of said intermediate disc relative to the outer discs will interpose a variable resistance to the relative movement of the vehicle parts to which said non-rotatable discs and said rotatable disc are respectively connected.

7. In a shock absorber, the combination of a plurality of inner and outer discs, the outer discs being relatively non-rotatable, a member adapted for rigid connection to a part of a vehicle and formed with a portion extending through said discs to maintain the same in axial alinement, an extension carried by an inner disc, and means for connecting said extension to another part of the vehicle, said means comprising a drag link having a ball and socket connection with said extension, a second ball and socket connection with the latter vehicle part, means for lubricating said ball and socket connections carried by said drag link, and means cooperating with the socket portion of said drag link to retain lubricant therein.

8. An attaching device for shock absorbers for motor vehicles, having a rotatable element provided with an arm, which comprises a drag link having a ball and socket connection with said arm, a two-part fitting formed with oppositely disposed jaws adapted to engage the axle of a vehicle, means for clamping said jaws in engagement with said axle, and a ball and socket connection between one part of said fitting and said drag link.

9. In a shock absorber for vehicles the combination of inner and outer disc-like elements, a stud passing through said elements for supporting the same in axial alinement, means carried by said stud in engagement with one of the outer discs to hold all of said elements in constant frictional contact, means for rigidly attaching said stud to the frame of the vehicle, an extension formed on one of said outer elements and adapted for connection to said vehicle frame, means formed integral with the other of said outer elements adapted for connection with said extension to render said outer elements relatively non-rotatable, an arm projecting from an intermediate element, and a connection between said frame and another part of the vehicle, whereby the relative movement of the vehicle parts will be controlled by said frictional elements.

10. A shock absorber for vehicles comprising a plurality of inner and outer annular elements, a stud passing through said elements for supporting same in superposed relation, a tensioning device carried by said stud to produce counter forces on the outer elements to maintain all of said elements in constant frictional contact, means for rigidly securing one end of said stud to the frame of a vehicle, an extension formed integral with one of said outer elements and adapted to be rigidly connected to said vehicle frame, a connection between the other outer element and said extension to render said outer elements relatively non-rotatable, an arm extending from an intermediate element, a link having a ball and socket connection with the extremity of said arm, a fitting adapted to be clamped to the axle of the vehicle, and a ball and socket connection between said link and said fitting whereby the relative movement of the vehicle parts will be controlled by the frictional contact of said elements.

11. A shock absorber for vehicles having spring supporting means, comprising inner and outer superposed discs, means for supporting said inner discs from a part of the vehicle and holding said discs immovable with relation to each other and to the vehicle parts, means for connecting an intermediate disc to another part of the vehicle, a tensioning device cooperatively associated with said discs, and means for adjusting the tension of said device to obtain a predetermined degree of initial resistance to the relative movement of the vehicle parts, said resistance varying proportionately with the extent of said relative movement.

12. A shock absorber for vehicles having spring supporting means, comprising inner and outer flat annular discs, means for supporting said discs in superposed relation and maintaining said outer discs immovable with relation to each other and to the vehicle part, an arm carried by an intermediate disc, said disc being rotatable on said supporting means, a tensioning device for holding all of said discs in constant frictional contact, and means embodying a universal joint for connecting the arm of said rotatable disc to another part of the vehicle, whereby a variable resistance will be interposed to the relative movement of the vehicle parts.

ARTHUR WATERMAN.